INVENTOR
GEORGE JOHN LUTZ
BY
ATTORNEYS

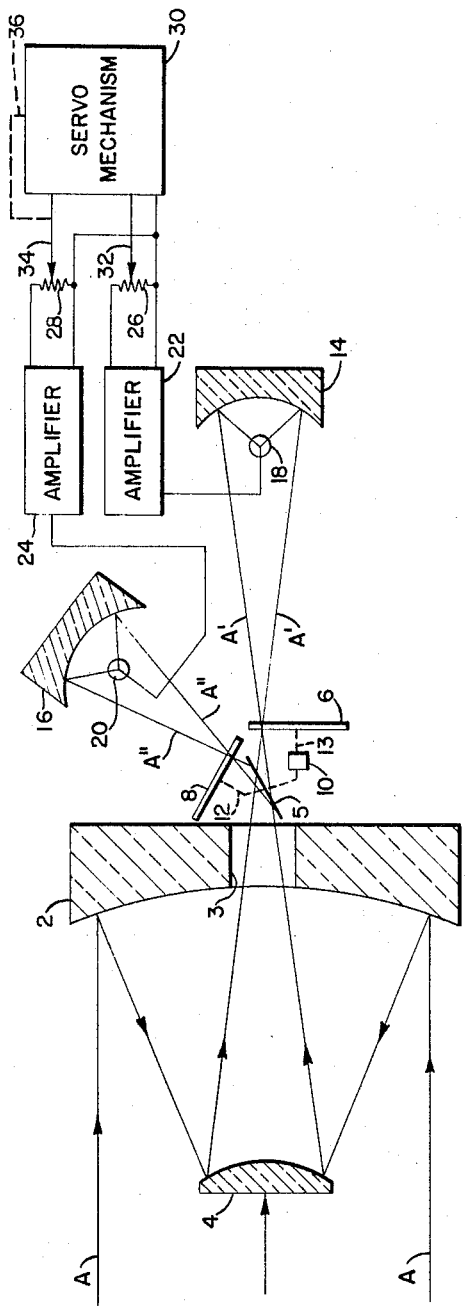
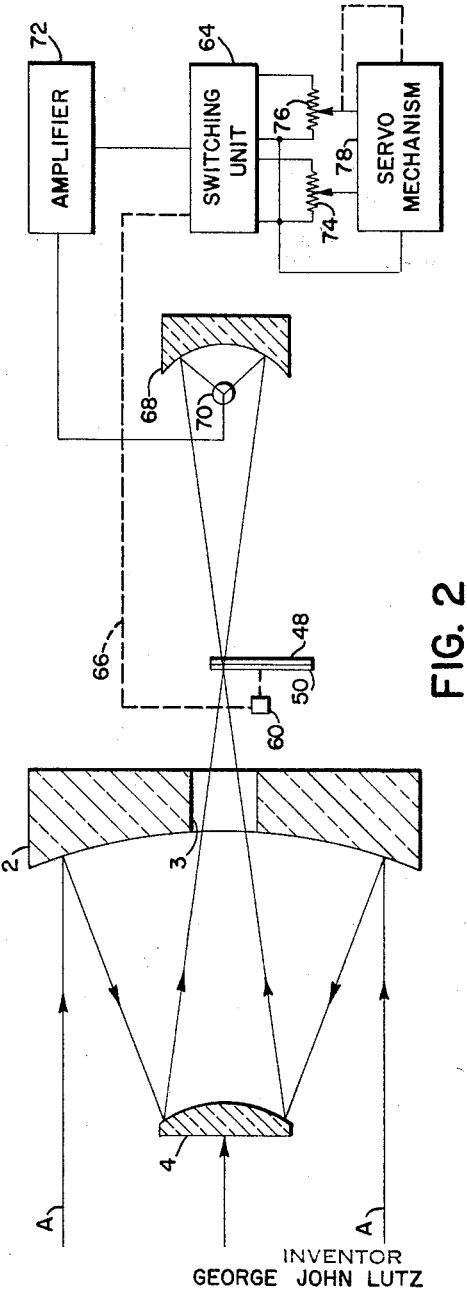
FIG. 1
FIG. 2
INVENTOR
GEORGE JOHN LUTZ

United States Patent Office 3,250,174
Patented May 10, 1966

3,250,174
METHOD AND APPARATUS FOR COMPARING RADIATION IN ONE SPECTRAL REGION WITH RADIATION IN ANOTHER SPECTRAL REGION
George John Lutz, Yonkers, N.Y., assignor to Farrand Optical Co., Inc., New York, N.Y., a corporation of New York
Filed Apr. 5, 1961, Ser. No. 100,861
9 Claims. (Cl. 88—14)

The present invention relates to a spectrometric apparatus and method for enhancing the accuracy with which there may be observed levels and changes of level in the intensity of radiation in a range or region of wavelengths of interest.

In accordance with the invention, such enhancement is obtained by comparing the radiation in the region of interest, hereinafter called "the first region," with the radiation in a selected reference region, hereinafter called "the second region" instead of comparing it with the radiation in other regions generally. More particularly, the invention provides apparatus and method by which such comparison is effected and in which the radiation is passed through a set of filters whose transmission characteristics (whether by actual transmission or by reflection) change with time in such a manner that spatially or time-sequentially separate beams of radiation are obtained in one of which the radiation in the first region is modulated at a known rate whereas other radiation in that beam is unmodulated, and in the other of which the radiation in the second region is modulated at a known rate whereas other radiation in that other beam is unmodulated. In this way, the only radiation in the first beam experiencing modulation is that in the first wavelength region and in the second beam the only radiation experiencing modulation is that in the second wavelength region. The two beams are then sent through a detection system responsive only to modulated radiation so that the radiation in the two regions may be compared. This possesses the advantage that the radiation in the first region to be observed, and especially changes therein, are a much larger fraction of the reference against which they are compared than would be the case if the reference range were indefinitely wide.

These characteristics are imposed on the two beams by passing the first through a set of filters which alternately pass and reject radiation in the first region while treating radiation of other wavelentghs in a time-invariant manner and by passing the second beam through a set of filters which alternately pass and reject radiation in the second region while simultaneously treating radiation of other wavelengths in a time-invariant manner.

The invention will now be further described with reference to the accompanying drawings in which:

FIGURES 1 and 2 are diagrammatic representations of two embodiments of the invention;

Figure 3:
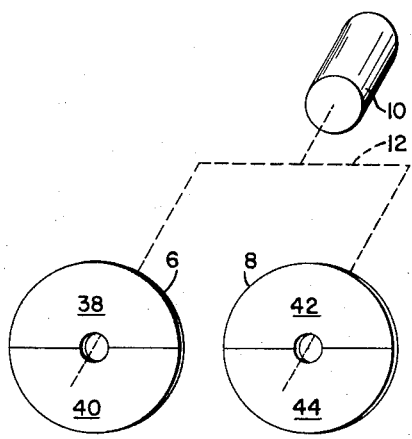
FIGURE 3 is a diagrammatic representation of the filters in the embodiment of FIG. 1.

In FIG. 1 there is indicated at A a beam of radiation to be analyzed with respect to its energy content in a particular spectral region. The beam A may for example comprise radiation which originates in a source of known spectral characteristics and has been passed through an absorption cell whose gas content is to be analyzed. Or it may comprise radiation from a source whose spectral characteristics are desired to be investigated. This beam is brought to a focus by means of primary and secondary mirrors 2 and 4 respectively, mirror 2 being apertured at 3 to permit the passage of the beam. Behind the aperture 3 there is disposed a beam-splitter 5 which may be a half-silvered mirror having preferably, as nearly as practicable, the same transmission and reflection coefficients throughout both the first and second wavelength regions.

At mirror 5 the beam A is split into two beams A' and A''. The beam A' passed undeviated through the beam-splitter is then passed through a first set of filters 6, called for convenience a radiation chopper, while the second beam A'' deviated by the beam-splitter is sent through a second set of filters referred to as a radiation chopper 8. These choppers are driven together from a motor 10 by mechanical linkages indicated at 12 and 13. The nature and operation of the choppers will be further described with reference to FIGS. 3 to 7.

Beams A' and A'' after passage through choppers 6 and 8 are focused by mirrors 14 and 16 on detecting devices 18 and 20 respectively. These may, for example, be photomultiplier tubes or thermocouples, each selected to possess appropriate response to radiation in the range of wavelengths which is modulated in the beam to which it is exposed. The electric signal output from detectors 18 and 20 is then passed through matched amplifiers 22 and 24 tuned to the frequency of the choppers 6 and 8. The output signals from these amplifier channels may then be observed or recorded in any suitable desired manner.

For example, the output signals of amplifiers 22 and 24, which may take the form of rectified voltages, may be applied across potentiometers 26 and 28, with one end of each potentiometer connected to a common ground in a servomechanism 30 which also receives the voltages from movable taps 32 and 34 on the potentiometers. By means of a link 36 one of the taps is adjusted by the servomechanism until the two voltage inputs thereto are equal. Under these conditions the position of the link 36 is a measure of the ratio of the output voltages from amplifiers 22 and 24 and hence of the ratio of the intensity of radiation in the first and second wavelength regions.

The choppers 6 and 8 are illustrated in FIG. 3. In chopper 6 one sector 38 transmits in the range of interest, the "first region," and the other sector 40 does not, whereas both sectors treat in the same way radiation outside the region of interest. In the chopper 8 one sector 42 transmits in the reference region or "second region" and the other sector 44 does not whereas both sectors treat in the same way radiation outside the reference region.

For concreteness there will be described, with reference to FIGS. 4 to 7, a set of transmission filters according to the invention for comparing the radiation in the region extending approximately from 9 to 10 microns with that in the immediately adjacent side bands, namely those extending approximately from 8 to 9 and from 10 to 11 microns. With these wavelength values for the filters, the invention permits observation of energy changes in the range 9 to 10 microns by reference to energy in the range from 8 to 9 and 10 to 11 microns and also, of course, observation of energy changes in the range from 8 to 9 and from 10 to 11 microns by reference to energy in the range from 9 to 10 microns. Thus either the first or the second region may be the region of interest and the other the reference region.

Figure 4:
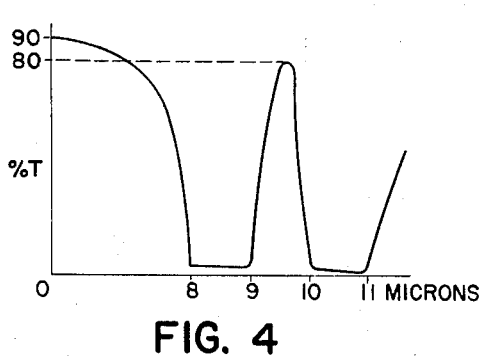
FIGURES 4 through 7 are graphs useful in explaining the operation of the embodiments of FIGURES 1 and 2.

For an embodiment of the invention operating in these wavelength regions one sector 38 may be made of fluorothene having a transmission characteristic as shown in FIG. 4 wherein percent transmission is plotted vertically as a function of wavelength in microns. Fluorothene is a plastic polymer of trifluorochloroethylene, $C_2F_3Cl$.

Figure 5:
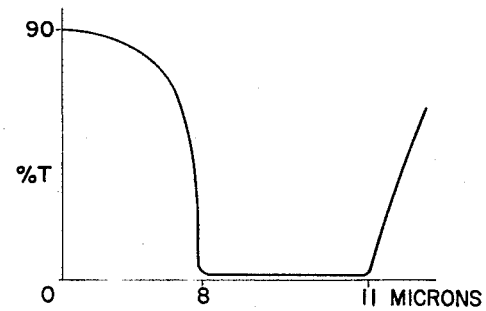
Figure 6:
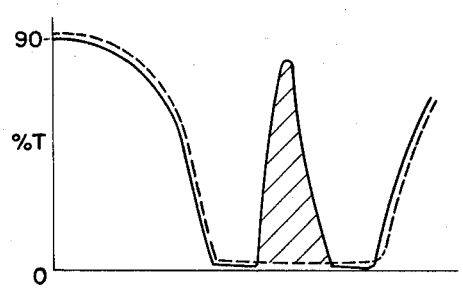

The other sector 40 of chopper 6 may be made of mica, having a transmission characteristic as shown in FIG. 5. The radiation passing through the combination of filters 38 and 40 will comprise essentially two parts—unmodulated radiation from 0 to 8 and above 11 microns, and radiation from 9 to 10 microns modulated at the rate of rotation of the chopper 6. This is illustrated in FIG. 6, where the cross-hatched area represents the only wavelengths (together with the relative transmission of the chopper for them) which are transmitted with modulation at the chopper rotation rate.

In chopper 8, one section 42 may be made of fluorothene while the other sector 44 may be wholly transparent, having at all wavelengths a uniform transmission equal to that of the sector 42 where the latter is fully transmissive.

Figure 7:
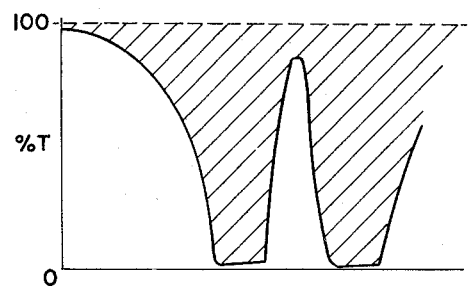

Sector 44 is thus transparent in the reference region from 8 to 9 and from 10 to 11 microns while sector 42 is opaque thereto. The radiation passing through chopper 8 will then also comprise essentially two parts—unmodulated energy in the region from 0 to 8, 9 to 10 and above 11 microns, and modulated energy in the region from 8 to 9 and from 10 to 11 microns. This is illustrated in FIG. 7 where the cross-hatched area represents the only wavelengths (together with the relative transmission of the chopper 8 thereto) which are transmitted with modulation at the rotation rate of chopper 8.

Amplfiers 22 and 24 are tuned respectively to the rates of rotation of choppers 6 and 8, which may for convenience be made the same, and the ratio-measuring potentiometers 26 and 28 and servomechanism 30 operate as already described.

This apparatus therefore permits comparison of the intensity of radiation present in beam A in a first wavelength region from 9 to 10 microns with the intensity of radiation present in beam A in a second wavelength region from 8 to 9 and from 10 to 11 microns.

The embodiment of FIG. 1 is subject to the disadvantage that the two channels extending from detectors 18 and 20 through amplifiers 22 and 24 should be matched to possess equal gains if true readings are to be obtained. This disadvantage is obviated in the embodiment illustrated in FIG. 2, wherein a single amplifying channel is time-shared between the two beams A' and A" which, however, occupy the same geometric position, the beam-splitting mirror 5 of FIG. 1 being dispensed with.

Figure 8:
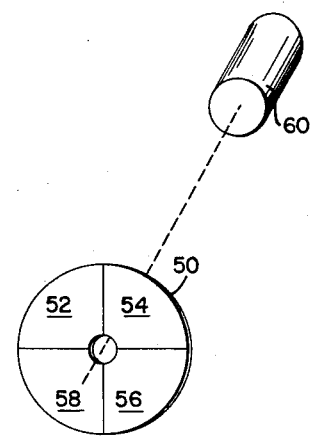
FIGURE 8 is a diagram illustrating the filters in the embodiment of FIGURE 2.

In FIG. 2 the beam of radiation A, focused by mirrors 2 and 4, is sent through a single chopper 50 whose construction is illustrated in FIG. 8. Chopper 50 in effect combines the choppers 6 and 8 of FIG. 1 and possesses, in the embodiment illustrated, four sectors 52, 54, 56 and 58. Sector 52 may be of fluorothene, sector 54 of mica, sector 56 of fluorothene and sector 58 of material transparent to all wavelengths under consideration.

Chopper 50 is driven by a motor 60 and motor 60 is also coupled to a switching unit 64 via a linkage 66. The radiation passing through chopper 50 is focussed by a mirror 68 onto a detector 70, whose output signal is amplified in an amplifier 72. The amplifier 72 then passes through switching unit 64 which has two output channels shown as potentiometers 74 and 76. The movable taps on these potentiometers form inputs to a ratio-measuring device 78 in the form of a servomechanism similar to the device 30 of FIG. 1.

The linkage 66 is so established that the output of amplifier 72 is switched from one channel 74 to another channel 76 and back again once for each complete cycle of filter sectors, i.e. once for each revolution of the four-sector chopper 50. Switching takes place as the chopper passes from the position in which one filter is interposed to the position which interposes the next, and again half a cycle of the chopper rotation later. In other words, switching takes place at the ends of either of the diameters of chopper 50 defined by the boundaries of its four sectors. The diameter selected determines which channel will contain the signal of FIG. 6 and which will contain the signal of FIG. 7. Suitable switching apparatus is shown for example, in the patent of Donald F. Hornig et al., No. 2,896,165.

Because the first and second wavelength regions are contiguous with the fluorothene and mica filtering materials described and do not have perfectly straight sides in the curves of FIGS. 6 and 7 (i.e. to the extent that FIGS. 6 and 7 include cross-hatched areas at the same wavelength), there will be a small amount of radiation at the same wavelengths which will pass through both pairs of the filters in choppers 6 and 8 with modulation, and to this extent the reference radiation energy is contaminated with that of the region of interest.

The transmission curves of mica and fluorothene actually differ not only in the transmission band possessed by fluorothene between 9 and 10 microns which mica does not exhibit but also in the fact that the decline in transmission of fluorothene in the vicinity of 8 microns occurs at somewhat lower wavelengths than is the case for mica. This means some transmission through the mica filter at wavelengths where there is no transmission through fluorothene, if radiation is present in the beam at these wavelengths. Hence, in the beam associated with the pair of filters of mica and fluorothene (the filters 38 and 40 of chopper 6 in FIG. 1 and the filters 52 and 54 or 54 and 56 in FIG. 8) there will be a modulation component which will be 180° of the modulation cycle out of phase with the modulation component of interest, namely that due to the transmission spike of fluorothene between 9 and 10 microns. To avoid this false reduction in the signal of interest, the sector 40 in FIG. 3 and the sector 54 in FIG. 8 may comprise two layers, one of mica and one of fluorothene, the fluorothene thus serving simply to block out transmission in the region between 8 and 9 microns, so that in the filter combination of fluorothene and fluorothene plus mica thus obtained the only modulation component will be that actually shown in FIG. 6.

More generally stated, it is desirable that the unlike filtering properties of the two filters of each filter combination consist exclusively of greater transmission at certain wavelengths (whether by passage through or by reflection) by one filter of the combination than by the other, without greater transmission at any wavelength by the second of those filters than by the first, at least over a wide range of wavelengths through which the detector or detectors are responisve, the "certain wavelengths" being different for the two pairs or combinations of filters. Thus advantageously in one filter pair, one filter should pass radiation in the region of interest while the other should not pass radiation there nor at any wavelength where that one filter does not, and in the other filter pair one filter should pass radiation in the reference region while the other filter of that other pair does not pass radiation there nor at any wavelength where that one filter of the other pair does not. In each pair of the greater transmission of one filter over the other must predominate over the greater transmission (if any) of the other filter over the first if a useful signal is to be obtained.

The loss of signal in the individual output channels (amplifiers 22 and 24 of FIG. 1 or potentiometers 74 or 76 of FIG. 2) which will occur unless this precaution is taken is to be distinguished from the falsification which will occur even if it is taken when, as in the embodiments which have been described, both filter combinations effect modulation of some radiation at the same wavelengths due to the slope of the sides of the 9 to 10 micron transmission peak for fluorothene.

Whether this precaution is observed or not, however, the invention is, of course, not limited to filters having the properties illustrated in FIGS. 4 and 5. The spectral region or regions where the two filters of one combination have unlike filtering properties are the regions—even if non-contiguous—in which energy if present in the beam passed through that combination will be modulated. These regions thus constitute, ipso facto, one of the "first" and "second" regions as those terms have been used herein. Similarly, the region or regions of unlike filtering properties of the other combination constitute the other of these first and second regions.

While the invention has been described herein in terms of a number of preferred embodiments, numerous departures may be made from the embodiments thus described when departing from the scope of the invention which is set forth in the appended claims. For example, the filters employed may be of reflection instead of transmission type, and the word "transmission" as used in the claims is to be understood to refer to filters of both types. If built into rotating discs, any even number of filter sectors may be employed. In systems of the type illustrated in FIG. 2, the chopper may include as in FIG. 8 each combination of filters once, or it may include each combination any larger number of times, so arranged that the light to be analyzed passes in succession through filters of the first combination, then through filters of the second combination and then through filters of the first combination and so on, with switching at 180° phase intervals of the complete filtering cycle which comprises passage of the light through the filters of each combination once.

Focusing systems other and different from the pair of mirrors 2 and 4 are obviously possible.

Moreover, the comparison made of the two signals obtained need not be the taking of their ratio. Their difference may be taken instead, or they may be individually observed and/or recorded without any comparison or combination thereon in the apparatus. Thus it may be simply desired to determine the concentration of an absorbing medium by measuring radiation intensity at two selected wavelengths. The apparatus of the invention which has been described provides means whereby this may be done.

I claim:

1. The method of comparing radiation in two wavelength regions which comprises sending the radiation through two pairs of filters, the filters of each pair having similar filtering properties throughout a range of wavelengths which is the same for both pairs, except that the filters of each pair have unlike filtering properties within a wavelength region lying within said range, said regions being different for the two pairs, cyclically shifting the filters of each pair with respect to said radiation to cause it to pass successively and cyclically through the filters of each pair, and producing in separate output channels signals representative respectively of the cyclical variations in the radiation passed through each pair of filters.

2. Spectrometric apparatus comprising first and second combinations of filters, the filters of each combination having similar filtering properties throughout a range of wavelengths which is the same for both combinations, except that the filters of each combination have unlike filtering properties within a wavelength region lying within said range, said regions being different for the two combinations, means to pass radiation at a cyclical rate through the filters of the first combination, means to pass radiation at a cyclical rate through the filters of the second combination, detection means for the radiation so passed through the filters of said combinations, and means to develop in separate channels signals representative of the excitation of said detection means by energy passed through the filters of each of said combinations and modulated at said cyclical rate.

3. Spectrometric apparatus comprising a first combination of filters having unlike filtering properties in a first spectral region and like filtering properties elsewhere in a broader range of wavelengths including said first spectral region, a second combination of filters having unlike filtering properties in a second spectral region lying within said range of wavelengths and like filtering properties elsewhere within said range of wavelengths, means to pass a beam of radiation through the filters of the first combination successively at a cyclical rate, means to pass another beam of radiation through the filters of the second combination successively at a cyclical rate, said beams having a common origin, detection means for each of said beams so passed, and means to develop in separate channels signals representative of the excitation of said detection means by energy modulated at said cyclical rate.

4. Spectrometric apparatus comprising a first combination of filters having unlike filtering properties in a first spectral region and like filtering properties elsewhere in a broader range of wavelengths including said first spectral region, a second combination of filters having unlike filtering properties in a second spectral region lying within said range of wavelengths and like filtering properties elsewhere within said range of wavelengths, means to pass a beam of radiation through the filters of the first combination successively at a cyclical rate, means to pass a beam of radiation through the filters of the second combination successively at a cyclical rate, said beams having a common origin, detection means for each of said beams so passed, and means to develop in a separate channel a signal representative of excitation of said detection means by energy of each of said beams which is modulated at the cyclical rate at which such beam is so passed.

5. Spectrometric apparatus comprising two pairs of optical filters, the filters of each pair having similar filtering properties throughout a range of wavelengths which is the same for both pairs, except that the filters of each pair have unlike filtering properties within a wavelength region lying within said range, said regions being different for the two pairs and the unlikeness of the filtering properties for each of said pairs comprising predominantly a greater transmission by one filter of such pair in said wavelength region than by the other filter of such pair, means to pass radiation from a common source through the filters of each pair successively at a cyclical rate, detection means for radiation so passed, and means to develop in separate channels signals representative of the excitation of said detection means by energy modulated at said cyclical rate and passed through the filters of said pairs respectively.

6. Spectrometric apparatus comprising first and second combinations of filters, the filters of each combination having similar filtering properties throughout a range of wavelengths which is the same for both combinations, except that the filters of each combination have unlike filtering properties within a wavelength region lying within said range, said wavelength regions being different for the two combinations, means to define radiation into a beam, a beam splitter disposed in the path of the beam so defined, means to pass each of the beams developed at said splitter through the filters successively of a separate one of said combinations at a cyclical rate, and separate means to develop signals representative of said beams as so passed through said filters, each of said signal-developing means being responsive to radiation modulated at the cyclical rate at which the beam applied thereto is passed through the corresponding one of said filter combinations.

7. Spectrometric apparatus comprising first and second combinations of filters, the filters of each combination having similar filtering properties throughout a range of wavelengths which is the same for both combinations, except that the filters of each combination have unlike filtering properties within a wavelength region lying within said range, said wavelength regions being different for the two combinations, means to pass a beam of light at a cyclical rate through the filters of each of said combinations, radiant energy detecting and signal amplifying means responsive to excitation varied at said cyclical rate, and means to sort to separate output channels synchronously with the operation of said beam passing means the outputs of said energy detecting and signal amplifying means representative of radiation passing through the filters of each of said combinations.

8. Spectrometric apparatus comprising first and second combinations of filters, the filters of each combination having similar filtering properties throughout a range of wavelengths which is the same for both combinations, except that the filters of each combination have unlike filtering properties within a wavelength region lying within said range, said wavelength regions being different for the two combinations, means to pass radiation from a common source through the filters successively of each of said combinations at a cyclical rate, and means to develop in separate output channels signals representative of the radiation passed through the filters of each of said combinations, said signal developing means being responsive to radiation varied at said cyclical rate.

9. Spectrometric apparatus comprising means to define radiation into a beam, two pairs of filters, the filters of one of said pairs having unlike spectral characteristics in a first wavelength region and like spectral characteristics elsewhere in a broader range of wavelengths including said first wavelength region and the filters of the other of said pairs having unlike spectral characteristics in a second wavelength region lying within said range and like spectral characteristics elsewhere in said range, means to interpose the filters of both of said pairs successively and cyclically into said beam, radiant energy detecting means arranged to receive the energy of said beam after passage through the filters of said pairs, signal amplifying means coupled to said detecting means, said signal amplifying means being responsive to excitation varied at said cyclical rate, and means to sort to separate output channels synchronously with the passage of said beam through the filters of said two pairs successively the outputs of said signal amplifying means representative of radiation passing through the filters of said two pairs respectively.

References Cited by the Examiner
UNITED STATES PATENTS 2,517,554   8/1950   Frommer.

DAVID H. RUBIN, *Primary Examiner.*

EMIL G. ANDERSON, JEWELL H. PEDERSEN,
*Examiners.*

THOMAS L. HUDSON, *Assistant Examiner.*